United States Patent [19]

Aichelmann, Jr. et al.

[11] 4,103,823

[45] Aug. 1, 1978

[54] PARITY CHECKING SCHEME FOR DETECTING WORD LINE FAILURE IN MULTIPLE BYTE ARRAYS

[75] Inventors: Frederick John Aichelmann, Jr., Hopewell Junction; Nino Mario Di Pilato, Unionvale; Thomas Peter Fehn, Mahopac; George John Rudy, Wappingers Falls, all of N.Y.

[73] Assignee: International Business Machines Corporation, Armonk, N.Y.

[21] Appl. No.: 752,336

[22] Filed: Dec. 20, 1976

[51] Int. Cl.$^2$ .................. G06F 11/00; G11C 29/00
[52] U.S. Cl. ................................. 235/312; 235/306
[58] Field of Search ............ 235/153 AM, 306, 312

[56] References Cited
U.S. PATENT DOCUMENTS

| | | | |
|---|---|---|---|
| 3,768,071 | 10/1973 | Knauft et al. | 235/153 AM X |
| 4,016,409 | 4/1977 | Kim | 235/153 AM |
| 4,028,539 | 6/1977 | Jacobs | 235/153 AM |

*Primary Examiner*—Jerry Smith
*Attorney, Agent, or Firm*—Robert J. Haase

[57] ABSTRACT

A parity checking scheme for detecting memory array word line failures whereby all of the data and parity bits of a plurality of bytes sharing the same word line erroneously assume the value "1" or the value "0". When storing data in the array, the data and parity bits comprising each byte are stored directly except for the parity bit of a selected one of the bytes, which parity bit is inverted by a gated inverter circuit before storing. The same gated inverter circuit also inverts the parity bit of the selected byte upon reading the stored data. All of the remaining bits of all of the remaining bytes are read directly. The read bits of each byte are applied to a respective parity checking circuit of the same even or odd parity type as is used in storing the data. The outputs of all of the parity checking circuits are applied to error control logic.

6 Claims, 4 Drawing Figures

EVEN PARITY

| | ODD NUMBER OF DATA BITS PER BYTE | | | EVEN NUMBER OF DATA BITS PER BYTE | | |
|---|---|---|---|---|---|---|
| | BYTE 1 $P_1$ | BYTE 2 $P_2$ | BYTE N $P_n$ | BYTE 1 $P_1$ | BYTE 2 $P_2$ | BYTE N $P_n$ |
| WRITE ALL ZERO'S INTO ARRAY | 1 | 0 | 0 | 1 | 0 | 0 |
| WRITE ALL ONE'S INTO ARRAY | 0 | 1 | 1 | 1 | 0 | 0 |
| READ FAILURE MODE OF ALL ZERO'S FROM ARRAY | *1* | 0 | 0 | *1* | 0 | 0 |
| READ FAILURE MODE OF ALL ONE'S FROM ARRAY | *0* | 1 | 1 | 0 | *1* | *1* |

FIG. 3

ODD PARITY

| | EVEN NUMBER OF DATA BITS PER BYTE | | |
|---|---|---|---|
| | BYTE 1 $P_1$ | BYTE 2 $P_2$ | BYTE N $P_n$ |
| WRITE ALL ZERO'S INTO ARRAY | 0 | 1 | 1 |
| WRITE ALL ONE'S INTO ARRAY | 0 | 1 | 1 |
| READ FAILURE MODE OF ALL ZERO'S FROM ARRAY | 1 | *0* | *0* |
| READ FAILURE MODE OF ALL ONE'S FROM ARRAY | *0* | 1 | 1 |

FIG. 4

PARITY CHECKING SCHEME FOR DETECTING WORD LINE FAILURE IN MULTIPLE BYTE ARRAYS

BACKGROUND OF THE INVENTION

The present invention generally relates to a parity checking technique and, more particularly, to such a technique for detecting the failure of word lines shared by a plurality of bytes whereby all of the bits erroneously assume the value "1" or the value "0".

In the case of read only storage arrays and random access memory arrays fabricated on semiconductor chips, for example, there are the possibilities that chip word line failure or chip power distribution failure might occur which cause all of the data and parity bits stored in the addressed word line to fail to an all "1" or all "0" state. Such failures cannot be detected by conventional even or odd bit parity checking shemes implemented on a per byte basis. For example, if an event number of bits per byte and an odd bit parity checking scheme is used on a per byte basis, the all "0's" failure mode would be detected, but the all "1's" failure mode would not be detected. That is, the odd number of "1's" (an even number of data bits plus one parity bit) would produce a valid odd bit parity check. If an even bit parity checking scheme had been used in the assumed case, the reverse situation would obtain, i.e., the all "1's" failure would be detected but the all "0's" failure would not be detected.

SUMMARY OF THE INVENTION

Memory array word line failures of the type whereby all the stored bits of a plurality of bytes sharing the same word line erroneously assume the value "1" or the value "0" are detected by the addition of a circuit which inverts the parity bit of a selected byte each time that said byte is written into or read from the array. All of the bytes otherwise are processed in a conventional manner. They are applied to respective parity checking circuits of the same type (all of the even or all of the odd parity bit type).

If each byte contains an odd number of bits and an even bit parity checking scheme is used, word line failure of both the all "1's" type and the all "0's" are detected by the parity checking circuit which receives the inverted parity bit. If each byte contains an even number of bits and an even bit parity checking scheme is used, only the word line failure of the all "0's" type is detected by the parity checking circuit which receives the inverted parity bit. Word line failure of the all "1's" type is detected by the checking circuits not receiving the inverted parity bit in the latter case.

If each byte contains an even number of bits and an odd bit parity checking scheme is used, word line failure of the all "1's" type is detected by the parity checking circuit which receives the inverted parity bit. If each byte contains an odd number of bits and an odd bit parity checking scheme is used, word line failure of both the all "1's" type and the all "0's" type are detected by the parity checking circuits which do not receive the inverted parity bit.

BRIEF DESCRIPTION OF THE DRAWING

FIG. 3 is a table illustrating the operation of the present invention for the even parity case wherein either an odd number or an even number of bits per byte are used; and FIG. 4 is a table illustrating the operation of the invention for the odd parity case where an even number of bits per byte are used.

DESCRIPTION OF THE PREFERRED EMBODIMENT

Figure 1:
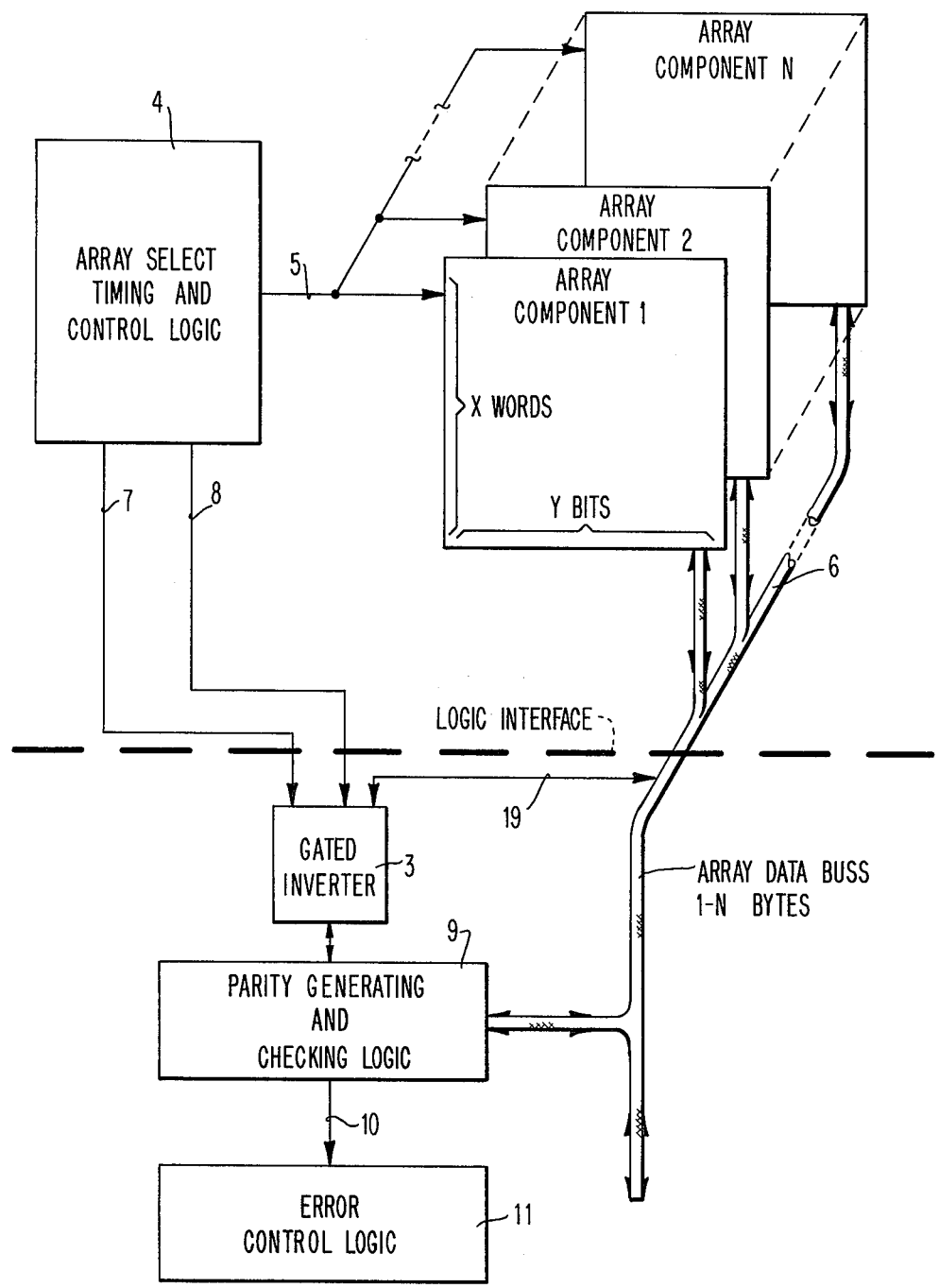
FIG. 1 is a simplified block diagram representing a multiple byte word line memory system utilizing the present invention.

FIG. 1 represents a multiple byte word line memory system which is adapted, by the inclusion of gated inverter 3, for the detection of word line failures within memory array components 1, 2, ... N whereby all of the bits of the bytes sharing a common word line erroneously assume the value of "1" or the value "0". Array components 1, 2, ... N are addressed in a conventional manner by array select timing and control logic 4. Array selection signals and word address signals are applied via control lines 5 to the array components. All of the bits of an addressed word from a selected array component are transmitted by array data buss 6 whenever data is read from or written into an array component. Logic 4 provides signals via lines 7 and 8 for actuating gated inverter 3 during the reading and writing operations, respectively, of the array components. Gated inverter 3 also is connected to a parity bit line (19) from the buss 6. As a matter of design choice, gated inverter 3 may be physically locted with the logic circuits (as shown) or may be placed on each of the array components.

Buss 6 comprises a number of lines equal to the number of bits (including the parity bits) of all bytes comprising the addressed word. Said lines communicate with parity generating and checking logic 9. The parity checking results obtained by logic 9 are represented by signals applied via lines 10 to error control logic 11. Logic 9 and logic 11 are conventional in nature and may be instrumented in accordance with well known odd bit parity or even bit parity checking techniques. Logic circuits suitable for use with the present invention are described in the book "Digital Design" by R. K. Richards, published by Wiley, 1971, pages 198–200.

Figure 2:
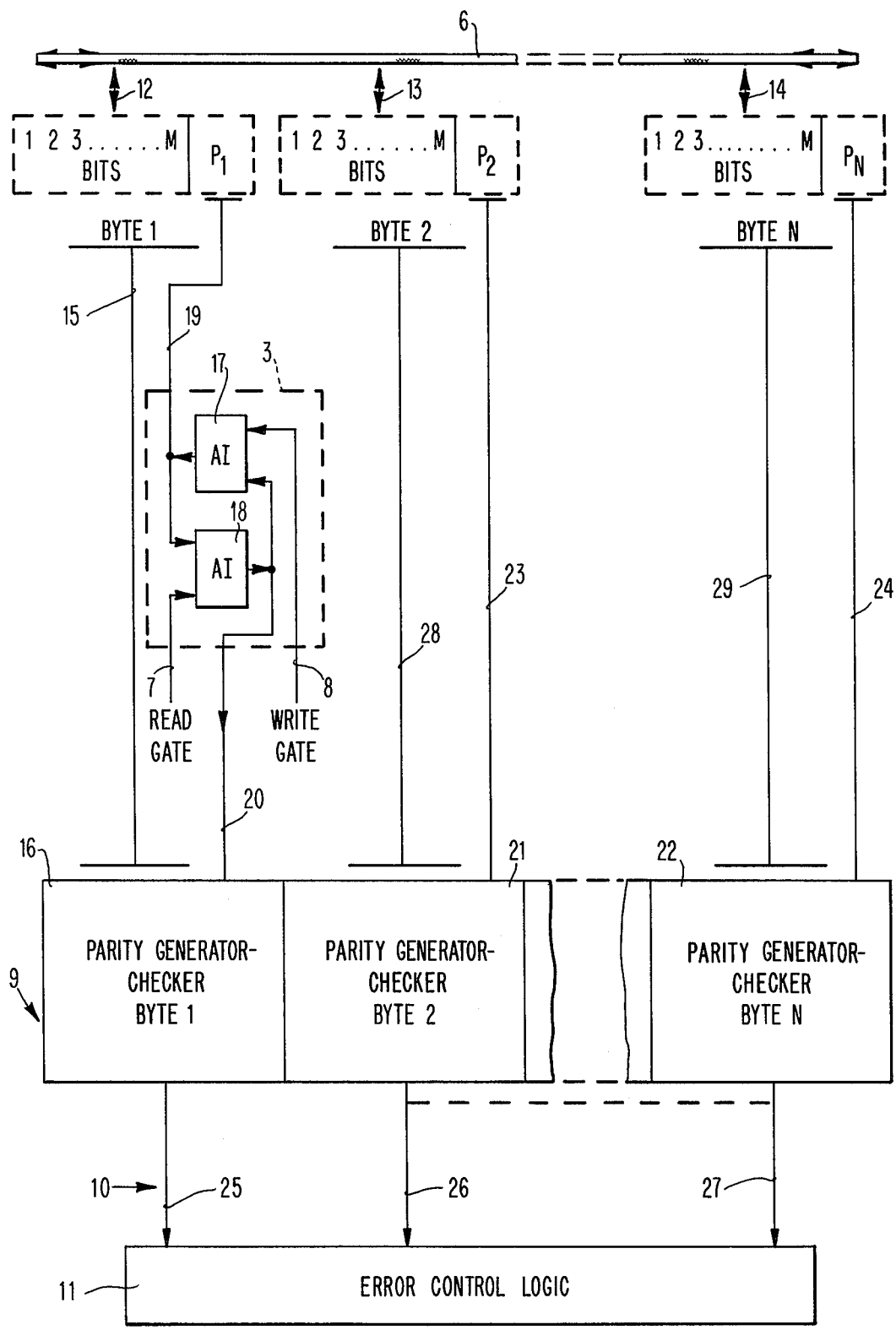
FIG. 2 is a simplified block diagram showing the gated inverter and parity generating and checking logic of FIG. 1 in greater detail.

The manner in which the bit signals of the selected word on buss 6 are processed by gated inverter 3 and parity generating and checking logic 9 may be better understood with the aid of FIG. 2. In FIG. 2, the lines comprising buss 6 have been separated into groups of lines 12, 13 and 14 in accordance with the respective bytes they represent. Each byte consists of M data bits and a single parity bit. Three bytes are shown by way of example, it being understood that any plurality of bytes can be used in connection with the present invention, depending upon the needs of a given memory system application. It should be noted that each of the bytes represented by signals on lines 12, 13 and 14 are from the same addressed word line within a selected one of memory array components 1, 2, ... N of FIG. 1.

The data signals comprising byte 1 are directly applied by lines 15 to parity generator-checker 16. The parity bit $P_1$ associated with byte 1 is applied to parity generator-checker 16 via gated inverter 3. Gated inverter 3, in turn, comprises a pair of AND inverter circuits 17 and 18 which receive parity bit line 19 from buss 6 and parity bit line 20 from parity generator-checker 16. AND inverter 18 additionally receives the read gating signal from line 7 of FIG. 1 while AND inverter 17 additionally receives the write gating signal from line 8 of FIG. 1. Each of the bit signals representing all of the remaining bytes and associated parity bits of the addressed word are directly applied to respective parity generator-checker circuits. Thus, the bit signals representing byte 2 and parity bit $P_2$ are directly applied to parity generator-checker 21 and the bits representing byte N and parity bit $P_n$ are directly applied to parity generator-checker 22.

As is well understood, each of the parity generator-checker circuits 16, 21 and 22 receives data signals representing a respective byte and generates a corresponding parity bit so as to make the total number of binary "1's" represented by the data bit signals and the parity bit signal equal to an odd number (if odd parity bit checking is used) or an even number (if even parity bit checking is used). For example, in the case of byte 1, the signals representing the data bits on lines 15 are processed by parity generator-checker 16 and an appropriate parity bit is generated and placed on line 20. In the case of byte 1, the parity bit on line 20 is inverted by AND inverter 17 (during a write operation) and then placed on line 19 of data buss 6 which, in turn, communicates with each of the array components 1, 2, ... N of FIG. 1. parity generator-checkers 21 and 22 operate in the same manner, processing the data bit signals of respective bytes on lines 28 and 29 and generating the approprite parity bit signals on lines 23 and 24, respectively. There is no parity bit inversion, however, with respect to bytes 2 ... N. Parity bit inversion takes place only with respect to byte 1 when reading or writing said byte into the memory system. Parity bit inversion is accomplished on reading by actuation of AND inverter circuit 18 in a manner analogous to the described writing operation.

FIGS. 3 and 4 summarize the operation of the present invention in detecting word line failures in the various situations that might arise in three different embodiments, i.e., even parity with odd number of bits per byte, even parity with even number of bits per byte, and odd parity with even number of bits per byte.

Referring to FIG. 3, the first row of the table represents the situation where all "0's" are properly written into the array without the occurrence of any error. In that case, the stored parity bits are as indicated with parity bit $P_1$ being a "1" due to the action of gated inverter 3 of FIGS. 1 and 2. The second row of the table of FIG. 3 represents the case where all "1's" are written into the array without the occurrence of any error. Accordingly, stored parity bit $P_1$ is a "0" where there is an odd number of bits per byte and is a "1" where there is an even number of bits per byte due to the action of gated inverter 3. It will be noted that in each of the four different cases represented by the first two rows of the table of FIG. 3, parity bit $P_1$ is inverted again upon reading the stored data so that it becomes identical in value to parity bits $P_2$ and $P_n$. Consequently, each of parity generator-checkers 16, 21 and 22 receive the same values for the parity bits and each checker will indicate the absence of any detected error. Thus, the presence of gated inverter 3 is of no consequence whatever in the case where no error is present either in writing into or reading from the memory array. More particularly, parity generator-checker 16 functions in its conventional manner to indicate no error as though gate inverter 3 had not been inserted in the parity bit line corresponding to byte 1.

The last two rows of the table of FIG. 3 represent the situation where word line failure occurs which causes all of the bits of all of the bytes sharing the common word line to be read as either all "1's" or as all "0's". Looking first at the even parity, odd number of bits per byte case, if the failure mode is of the all "0's" type, parity bit $P_1$ is inverted by AND inverter 18 of FIG. 2 and applied to parity generator-checker 16 as a "1". Parity generator-checker 16 independently produces a parity bit from the all "0" data bits received via lines 15 representing byte 1. The generated data bit is a "0" which does not match the inverted parity bit $P_1$ which is a "1". Accordingly, a signal representing the presence of error is applied via line 25 of FIG. 2 to error control logic 11 for appropriate action. Inasmuch as the error is "flagged" by parity bit $P_1$ in this case, it is characterized by the cross hatching in the third row of the table of FIG. 3. The same result follows in the case of the all "0" failure mode where even parity and an even number of bits per byte are used.

Referring now to the bottom row of the table of FIG. 3 and considering the all "1's" failure mode, it can be seen that the error condition is flagged by the 0 value of the cross-hatched $P_1$ parity bit because said parity bit does not match the "1" parity bit generated by parity generator-checker 16 in response to the all "1" values of the data bits communicated to it via lines 15 of FIG. 2. In the case where an even number of bits per byte are used, error is not detected by parity bit $P_1$ but rather by parity bits $P_2$ and $P_n$ as indicated by the shading in the last row of the table of FIG. 3. In the last named instance, parity generator-checkers 21 and 22 each produce a parity bit having a value 0 based on the "1" values for all of the data bits communicated via lines 28 and lines 29, respectively. Thus, parity generator-checker 21 produces an error signal on line 26 upon mismatch of the read parity bit $P_2$ on line 23 and the generated parity bit $P_2$. Similarly, parity generator-checker 22 provides an error signal on line 27 representing the mismatch between the "1" value of the read parity bit $P_n$ on line 24 and the "0" value of the generated parity bit $P_n$.

As in the case of FIG. 3, the table of FIG. 4 characterizes the inverted parity bit $P_1$ by cross hatching in the case where it flags the error condition and characterizes by shading the parity bits $P_2$ and $P_n$ in the respective cases where they flag the error condition. It will be observed that only the odd parity case involving an even number of bits per byte is treated in the table of FIG. 4. The odd parity case wherein an odd number of bits per byte are utilized is not described because the inverted parity bit $P_1$ of the present invention does not itself flag the error condition in either the all "0's" or all "1's" failure modes in that case.

While the invention has been particularly shown and described with reference to the preferred embodiment thereof, it will be understood by those skilled in the art that various changes in form and details may be made therein without departing from the spirit and scope of the invention.

What is claimed is:
1. Word line failure detecting apparatus comprising:
 word line means for storing a plurality of bytes of data bit signals and respective parity bit signals,
 an equal plurality of parity generating and checking means, means for directly applying the data bit signals of each stored byte to a respective one of said parity generating and checking means, means for directly intercoupling the parity bit signals associated with all but one of said stored bytes with respective parity generating and checking means, and means for inversely intercoupling the parity bit signal associated with said one of said stored bytes with its respective parity generating and checking means.

2. Apparatus as defined in claim 1 wherein each said parity checking means is of the even parity type.

3. Apparatus as defined in claim 2 wherein each byte comprises an odd number of bits.

4. Apparatus as defined in claim 2 wherein each byte comprises an even number of bits.

5. Apparatus as defined in claim 1 wherein each said parity checking means is of the odd parity type.

6. Apparatus as defined in claim 5 wherein each byte comprises an even number of bits.

* * * * *